(12) United States Patent
Mizutani et al.

(10) Patent No.: US 10,661,777 B2
(45) Date of Patent: May 26, 2020

(54) DELIVERY SYSTEM AND VEHICLE

(71) Applicant: TOYOTA JIDOSHA KABUSHIKI KAISHA, Toyota-shi, Aichi-ken (JP)

(72) Inventors: Atsushi Mizutani, Toyota (JP); Hirotaka Karube, Toyota (JP); Daiki Kaneichi, Nisshin (JP); Kenichi Komuro, Nagoya (JP); Jun Kondo, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 28 days.

(21) Appl. No.: 16/169,596

(22) Filed: Oct. 24, 2018

(65) Prior Publication Data

US 2019/0126903 A1   May 2, 2019

(30) Foreign Application Priority Data

Oct. 27, 2017   (JP) .................................. 2017-207941

(51) Int. Cl.
| | | |
|---|---|---|
| *B60W 10/26* | (2006.01) | |
| *B60H 1/32* | (2006.01) | |
| *B60R 16/033* | (2006.01) | |
| *G06Q 10/04* | (2012.01) | |
| *B60P 3/20* | (2006.01) | |
| *B60L 58/10* | (2019.01) | |
| *G06Q 50/28* | (2012.01) | |
| *B60L 53/14* | (2019.01) | |
| *B60R 25/00* | (2013.01) | |

(52) U.S. Cl.
CPC ............ *B60W 10/26* (2013.01); *B60H 1/3205* (2013.01); *B60H 1/3232* (2013.01); *B60L 58/10* (2019.02); *B60P 3/20* (2013.01); *B60R 16/033* (2013.01); *G06Q 10/04* (2013.01); *B60H 2001/3266* (2013.01); *B60L 53/14* (2019.02); *B60R 25/00* (2013.01); *G06Q 50/28* (2013.01)

(58) Field of Classification Search
CPC ......... B60W 10/26; B60L 58/10; B60L 53/14; B60H 1/3205; B60H 1/3232; B60H 2001/3266; B60P 3/20; B60R 16/033; B60R 25/00; G06O 10/04; G06O 50/28
See application file for complete search history.

(56) References Cited

FOREIGN PATENT DOCUMENTS

WO   2012-141214 A1   10/2012

*Primary Examiner* — Robert L Deberadinis
(74) *Attorney, Agent, or Firm* — Hunton Andrews Kurth LLP

(57) ABSTRACT

The delivery system includes a vehicle and a server. The vehicle includes a power storage device and a refrigerator. The server performs a delivery planning process for determining an expected delivery time. In the delivery planning process, the server is configured to transmit, to the vehicle, an inquiry as to reception of the delivery matter. When the vehicle receives the inquiry from the server, the vehicle is configured to set a receivable time period and transmit it to the server. When the vehicle sets the receivable time period, if the vehicle is in a state that the vehicle is able to receive power from the power supply facility, the vehicle is configured to set the receivable time period to be longer than the receivable time period set if the vehicle is not in the state that the vehicle is able to receive power from the power supply facility.

5 Claims, 7 Drawing Sheets

DELIVERY SYSTEM AND VEHICLE

This nonprovisional application is based on Japanese Patent Application No. 2017-207941 filed on Oct. 27, 2017, with the Japan Patent Office, the entire contents of which are hereby incorporated by reference.

BACKGROUND

Field

The present disclosure relates to a delivery system for delivering a delivery matter to a vehicle including a refrigerator, as well as the vehicle used for the delivery system.

Description of the Background Art

WO2012/141214 discloses an electrically powered vehicle including a power storage device and a refrigerator configured to operate using power of the power storage device.

SUMMARY

The inventors of the present application have been studying a delivery system for delivering a delivery matter to a vehicle including a refrigerator. In this delivery system, some types of delivery matters are desirably retained and cooled in the refrigerator of the vehicle for a period of time until a user receives the delivery matters. For example, for frozen foods such as ice creams, it is desirable to set a temperature inside the refrigerator to the freezing point or lower. On the other hand, perishable foods such as meat or fish are desirably retained at a normal temperature or lower.

The refrigerator included in the vehicle is supplied with power from the power storage device included in the vehicle. Hence, when an amount of power in the power storage device is small, a time period (hereinafter, also referred to as "receivable time period") during which a delivery matter can be retained and cooled within the refrigerator becomes short, with the result that a degree of freedom for a delivery business entity in determining an expected delivery time may be decreased.

The present disclosure has been made in view of the above problem and has an object to facilitate determination of a time at which a delivery matter is delivered to a refrigerator of a vehicle.

(1) A delivery system according to the present disclosure includes a vehicle and a server configured to communicate with the vehicle. The vehicle includes: a power storage device configured to be charged using power supplied from a power supply facility external to the vehicle; and a refrigerator configured to be operated using power of the power storage device. The server is configured to perform a delivery planning process for determining an expected delivery time at which a delivery matter required to be cooled during retention is delivered to the refrigerator of the vehicle. In the delivery planning process, the server is configured to transmit, to the vehicle, an inquiry as to reception of the delivery matter. When the vehicle receives the inquiry from the server, the vehicle is configured to set a receivable time period and transmit the receivable time period to the server, the receivable time period being a time period during which the delivery matter is able to be cooled within the refrigerator. When the vehicle sets the receivable time period, if the vehicle is in a state that the vehicle is able to receive power from the power supply facility, the vehicle is configured to set the receivable time period to be longer than the receivable time period set if the vehicle is not in the state that the vehicle is able to receive power from the power supply facility.

According to the above-described system, if the vehicle is in the state that the vehicle can receive power from the power supply facility, the receivable time period is set to be longer than the receivable time period set if the vehicle is not in the state that the vehicle can receive power from the power supply facility, in view of such a fact that the refrigerator can be operated using power supplied from the power supply facility in addition to power of the power storage device. This leads to an increased degree of freedom for the server in determining an expected time at which the delivery matter is delivered to the refrigerator of the vehicle. As a result, a time of delivering the delivery matter to the refrigerator of the vehicle can be facilitated to be determined.

(2) In a certain embodiment, in the delivery planning process, the server is configured to: receive the receivable time period from the vehicle; and receive, from an external terminal, an expected reception time of the delivery matter for a user of the vehicle. The server is configured to set, as the expected delivery time, a time included in a period from (i) a time preceding the expected reception time by the receivable time period to (ii) the expected reception time.

According to the above-described embodiment, the time period from the expected delivery time of the delivery matter to the expected reception time for the user is set to be shorter than the receivable time period in the vehicle. Therefore, the delivery matter can be retained and cooled within the refrigerator during the period from the delivery of the delivery matter to the vehicle to the reception of the delivery matter by the user. As a result, the quality of the delivery matter can be suppressed from being deteriorated by the time the user receives the delivery matter.

(3) In a certain embodiment, in the delivery planning process, the server is configured to transmit, to the vehicle, delivery information including the expected delivery time and a retention temperature for the delivery matter. When the vehicle receives the delivery information from the server, the vehicle is configured to preliminarily operate the refrigerator before the expected delivery time is reached, so as to control a temperature in the refrigerator at the expected delivery time to be the retention temperature.

According to the above-described embodiment, the refrigerator is preliminarily operated before the expected delivery time is reached, so as to control the temperature in the refrigerator at the expected delivery time to be the retention temperature for the delivery matter. Therefore, as compared with a case where the refrigerator is operated after the delivery matter is delivered to the vehicle, the quality deterioration of the delivery matter can be suppressed appropriately from the moment of the delivery of the delivery matter.

(4) In a certain embodiment, when the vehicle sets the receivable time period, if the vehicle is not in the state that the vehicle is able to receive power from the power supply facility, the vehicle is configured to set the receivable time period to be longer as an amount of power stored in the power storage device is larger.

According to the above-described embodiment, even if the vehicle is not in the state that the vehicle can receive power from the power supply facility, the receivable time period is set to be longer as the amount of power stored in the power storage device is larger. Accordingly, while suppressing the power of the power storage device from being run out due to the operation of the refrigerator, the receivable time period can be set to be as long as possible.

(5) A vehicle according to the present disclosure includes: a power storage device configured to be charged using power supplied from a power supply facility external to the vehicle; a refrigerator configured to be operated using power of the power storage device; and a controller configured to set a receivable time period, the receivable time period being a time period during which a delivery matter required to be cooled during retention is delivered to the vehicle and is able to be retained in the refrigerator. When the controller sets the receivable time period, if the vehicle is in a state that the vehicle is able to receive power from the power supply facility, the controller is configured to set the receivable time period to be longer than the receivable time period set if the vehicle is not in the state that the vehicle is able to receive power from the power supply facility.

According to the above-described vehicle, if the vehicle is in the state that the vehicle can receive power from the power supply facility, the receivable time period is set to be longer than the receivable time period set if the vehicle is not in the state that the vehicle can receive power from the power supply facility, in view of such a fact that the refrigerator can be operated using power supplied from the power supply facility in addition to power of the power storage device. This leads to an increased degree of freedom for the server in determining an expected time at which the delivery matter is delivered to the refrigerator of the vehicle. As a result, a time of delivering the delivery matter to the refrigerator of the vehicle can be facilitated to be determined.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
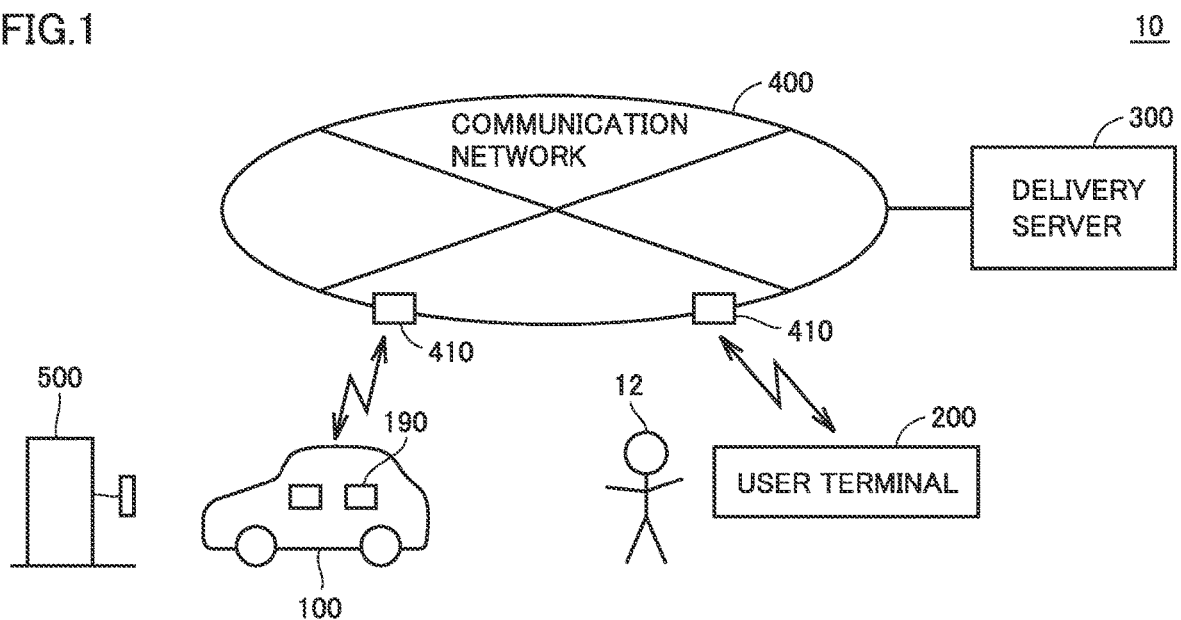
FIG. 1 schematically shows an entire configuration of a delivery system.

The following describes embodiments of the present disclosure with reference to figures in detail. It should be noted that the same or corresponding portions are given the same reference characters and are not described repeatedly.

<System Configuration>

FIG. 1 schematically shows an entire configuration of a delivery system 10 according to the present embodiment. Delivery system 10 includes an electrically powered vehicle (hereinafter, also simply referred to as "vehicle") 100, a user terminal 200, and a delivery server 300. Vehicle 100, user terminal 200 and delivery server 300 are configured to communicate with one another via a communication network 400 such as the Internet or a telephone network. It should be noted that each of vehicle 100 and user terminal 200 is configured to send and receive information to and from a base station 410 of communication network 400 through wireless communication.

Vehicle 100 is an electric vehicle (EV) configured to generate driving power for traveling using electric power from a power storage device 110 mounted thereon and to permit charging of power storage device 110 using electric power supplied from a power supply facility 500 external to the vehicle. Moreover, vehicle 100 includes a refrigerator 190 configured to operate using power of power storage device 110. The configuration of vehicle 100 will be described below in detail.

User terminal 200 is a communication device used by a user 12 of vehicle 100. Examples of user terminal 200 include a personal computer, a smartphone, a mobile phone, and the like.

User 12 can input various types of information using user terminal 200. For example, user 12 can access a homepage of a seller to purchase a merchandise item and can designate refrigerator 190 of vehicle 100 as a delivery location for the merchandise item.

Delivery server 300 is a server maintained and managed by a delivery business entity. Delivery server 300 determines a time (hereinafter, also referred to as "expected delivery time") at which a delivery matter (hereinafter, also referred to as "cooled delivery matter") required to be cooled during retention is expected to be delivered to refrigerator 190 of vehicle 100, and notifies the determined expected delivery time to vehicle 100 and user terminal 200.

Figure 2:
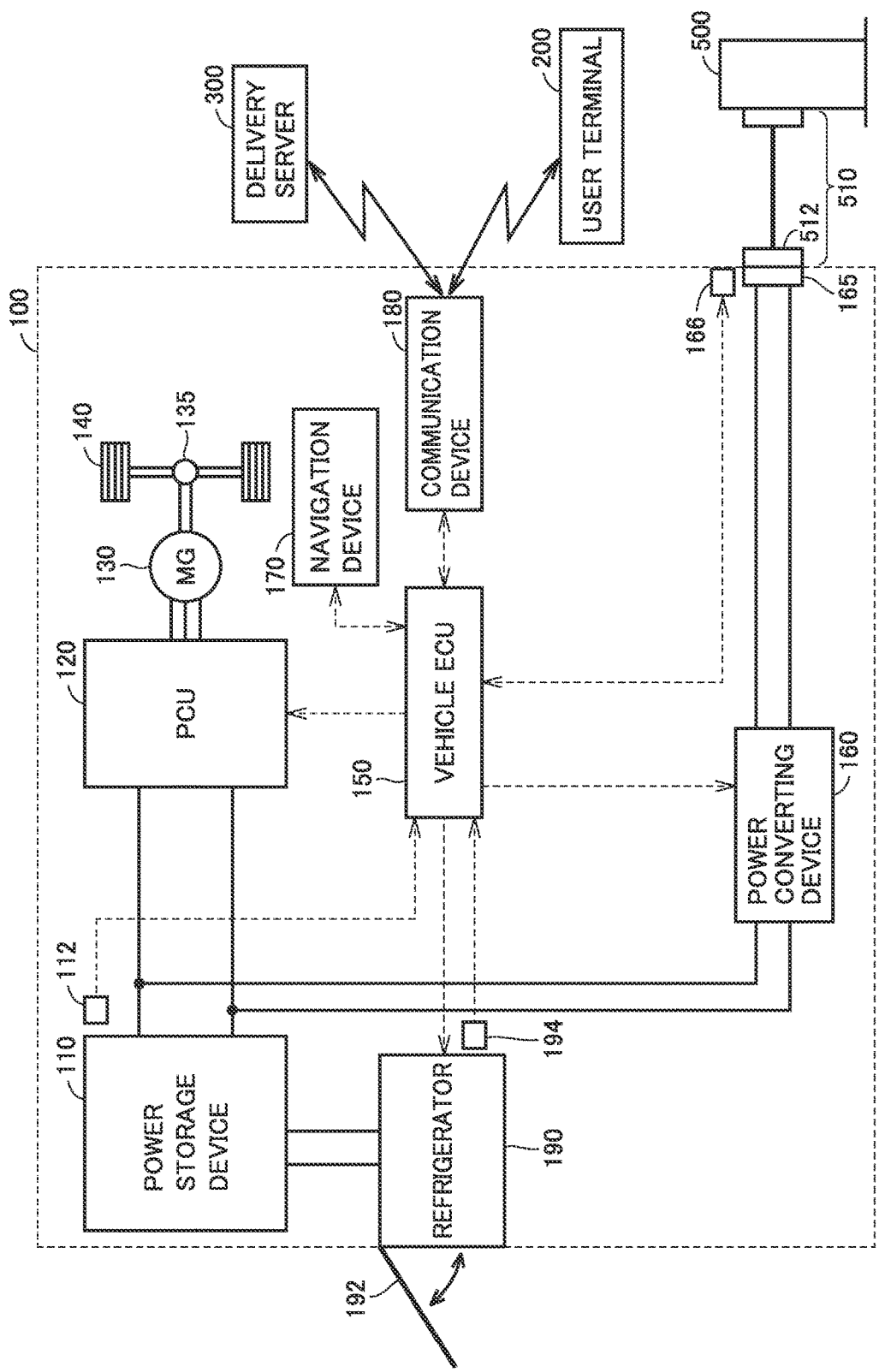
FIG. 2 shows an exemplary configuration of a vehicle.

FIG. 2 shows an exemplary configuration of vehicle 100. Vehicle 100 includes power storage device 110, a PCU 120 serving as a driving device, a motor generator 130, a power transmitting gear 135, driving wheels 140, a vehicle ECU (Electronic Control Unit) 150, and a navigation device 170.

Power storage device 110 is configured to be charged and discharged. Power storage device 110 is configured to include a secondary battery such as a lithium ion battery or a nickel-hydrogen battery, or include a power storage element such as an electric double layer capacitor, for example. Power storage device 110 supplies electric power to PCU 120 so as to generate driving power of vehicle 100. Further, power storage device 110 stores electric power generated by motor generator 130.

A monitoring unit 112 is provided at power storage device 110. Monitoring unit 112 includes sensors configured to detect voltage, current, temperature, and the like of power storage device 110. Monitoring unit 112 outputs a detection result of each sensor to vehicle ECU 150. Based on the information from monitoring unit 112, vehicle ECU 150 can calculate an SOC (State Of Charge), which indicates an amount of power stored in power storage device 110. It should be noted that the sensors are accommodated in the one unit in FIG. 1 but may be disposed separately.

PCU 120 is controlled by a control signal from vehicle ECU 150 and converts DC power received from power storage device 110 into AC power for driving motor generator 130.

Motor generator 130 is an AC rotating electrical machine configured to operate using power supplied from PCU 120. Output torque of motor generator 130 is transmitted to driving wheels 140 via power transmitting gear 135 to travel vehicle 100. Motor generator 130 is capable of generating electric power using rotation power of driving wheels 140 when vehicle 100 operates for regenerative braking. The electric power generated by motor generator 130 is converted by PCU 120 into charging power for power storage device 110.

Vehicle 100 further includes a communication device 180. Communication device 180 is an interface for wireless communicative connection to communication network 400. Communication device 180 can communicate with delivery server 300 and user terminal 200 both connected to communication network 400.

As a configuration for charging power storage device 110 using power supplied from power supply facility 500 external to the vehicle, vehicle 100 further includes a power converting device 160 and a connector 165.

Connector 165 is configured to permit connection with a charging connector 512 of a charging cable 510 used to connect vehicle 100 and power supply facility 500. When charging cable 510 connected to power supply facility 500 is connected to connector 165 of vehicle 100, vehicle 100 is brought into a state that vehicle 100 can receive power from power supply facility 500.

A connection sensor 166 is provided at connector 165. Connection sensor 166 detects whether or not power supply facility 500 is connected to connector 165 via charging cable 510, and transmits the detection result to vehicle ECU 150.

Power converting device 160 is connected between power storage device 110 and connecter 165. Power converting device 160 is controlled by a control signal from vehicle ECU 150. When charging power storage device 110 using power supplied from power supply facility 500, power converting device 160 converts the power supplied from power supply facility 500 into power with which power storage device 110 can be charged.

Vehicle ECU 150 includes a CPU (Central Processing Unit), a storage device, and an input/output buffer, so as to receive signals from sensors, send control signals to devices, and control vehicle 100 and the devices. It should be noted that they can be controlled by not only a process performed by software but also a process performed by dedicated hardware (electronic circuit) constructed therefor.

Navigation device 170 includes: a storage device configured to store map information or the like; a location detecting device configured to detect location information of vehicle 100 using GPS (Global Positioning System); a display device (liquid crystal panel or the like) configured to present the current location of vehicle 100 or a route to a destination; and an input device (a touch panel, a switch, or the like) configured to receive an operation by the user.

Moreover, vehicle 100 further includes refrigerator 190 configured to operate using power of power storage device 110. Refrigerator 190 is configured to cool inside of refrigerator 190 by circulating refrigerant in a cooling circuit including a condenser, an expansion valve, an evaporator, a compressor, and the like. Refrigerator 190 is configured to be opened and closed by way of a door 192 operable from outside the vehicle. For example, a delivery person who delivers a delivery matter to refrigerator 190 of vehicle 100 can open door 192 from outside the vehicle to store the delivery matter in refrigerator 190.

A temperature sensor 194 is provided at refrigerator 190. Temperature sensor 194 is configured to detect a temperature inside refrigerator 190, and transmit the detection result to vehicle ECU 150. By adjusting output (refrigerant flow rate) of the compressor, vehicle ECU 150 can control the temperature inside refrigerator 190 detected by temperature sensor 194 to be a target temperature (for example, temperature suitable for retaining of the delivery matter).

Figure 3:
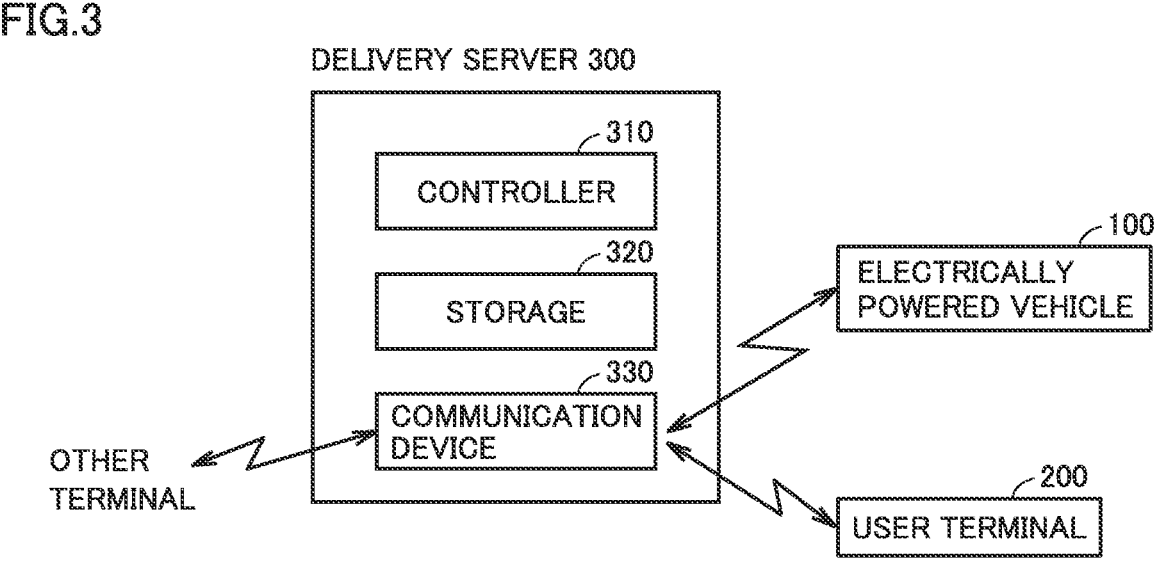
FIG. 3 is a block diagram showing a configuration of a delivery server.

FIG. 3 is a block diagram showing a configuration of delivery server 300. Delivery server 300 includes a controller 310, a storage 320, and a communication device 330.

Communication device 330 is an interface for communication with vehicle 100, user terminal 200, other terminals, and the like via communication network 400. In storage 320, information received from vehicle 100, user terminal 200, the other terminals, and the like are stored.

For delivery of a cooled delivery matter to refrigerator 190 of vehicle 100 in accordance with a delivery request input from an external terminal or the like, controller 310 of delivery server 300 performs a "delivery planning process" for determining an expected delivery time of the cooled delivery matter through communication between vehicle 100 and user terminal 200 and for notifying the determined expected delivery time to vehicle 100 and user terminal 200.

<Delivery Planning Process>

Refrigerator 190 included in vehicle 100 is supplied with power from power storage device 110 included in vehicle 100. Hence, when the SOC of power storage device 110 is low (i.e., the amount of power in power storage device 110 is small), a time period (hereinafter, also referred to as "receivable time period") during which a cooled delivery matter can be retained and cooled within refrigerator 190 becomes short, with the result that a degree of freedom for delivery server 300 in determining an expected delivery time may be decreased.

In view of this, in delivery system 10 according to the present embodiment, when power supply facility 500 is connected to vehicle 100, the degree of freedom for delivery server 300 in determining the expected delivery time is increased by setting the receivable time period in vehicle 100 to be long.

Figure 4:
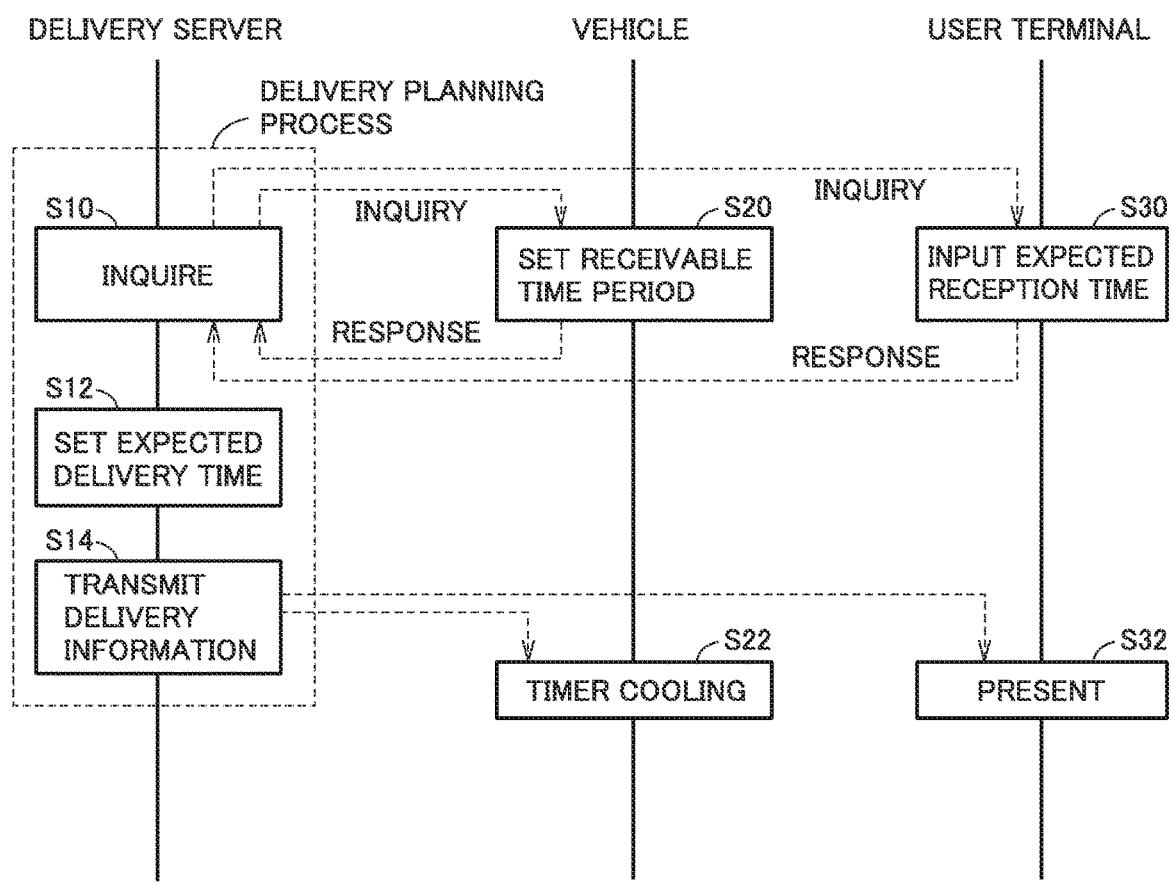
FIG. 4 shows an exemplary process performed among the delivery server, the vehicle, and a user terminal.

FIG. 4 shows an exemplary process performed among delivery server 300 (more specifically, controller 310), vehicle 100 (more specifically, vehicle ECU 150), and user terminal 200.

In order to deliver a cooled delivery matter to refrigerator 190 of vehicle 100 in accordance with a delivery request or the like input from an external terminal or the like, delivery server 300 performs the delivery planning process (steps S10, S12, S14). It should be noted that information of the delivery request input to delivery server 300 from the external terminal or the like includes: information of the merchandise item name and retention temperature (temperature suitable for retention) of the cooled delivery matter; identification information and location information for specifying vehicle 100, which is the delivery location; address information for communication with vehicle 100 and user terminal 200 held by the user of vehicle 100; and the like.

In the delivery planning process, delivery server 300 first transmits, to vehicle 100 and user terminal 200, an inquiry as to reception of the cooled delivery matter (step S10).

Specifically, delivery server 300 transmits the merchandise item name and retention temperature of the cooled delivery matter to vehicle 100, and makes an inquiry to vehicle 100 so as to request a response as to an allowed reception period for the cooled delivery matter.

When vehicle 100 receives the inquiry from delivery server 300, vehicle 100 sets a receivable time period for the cooled delivery matter (step S20). In this case, vehicle 100 sets the receivable time period for a case where power supply facility 500 is connected to vehicle 100, to be longer than the receivable time period for a case where power supply facility 500 is not connected to vehicle 100, in view of such a fact that refrigerator 190 can be operated using power supplied from power supply facility 500 in addition to power of power storage device 110. Moreover, when power supply facility 500 is not connected to vehicle 100, vehicle 100 sets the receivable time period to be longer as the SOC of power storage device 110 is higher (the amount of power stored in power storage device 110 is larger).

It should be noted that in the delivery planning process according to the present embodiment, it is assumed that the cooled delivery matter is delivered to vehicle 100 within a relatively short period of time (for example, about some hours) from the transmission of the inquiry from delivery server 300 to vehicle 100. Therefore, it is assumed that the connection state between vehicle 100 and power supply facility 500 when vehicle 100 has received the inquiry from delivery server 300 is maintained until the cooled delivery matter is delivered to vehicle 100.

Figure 5:
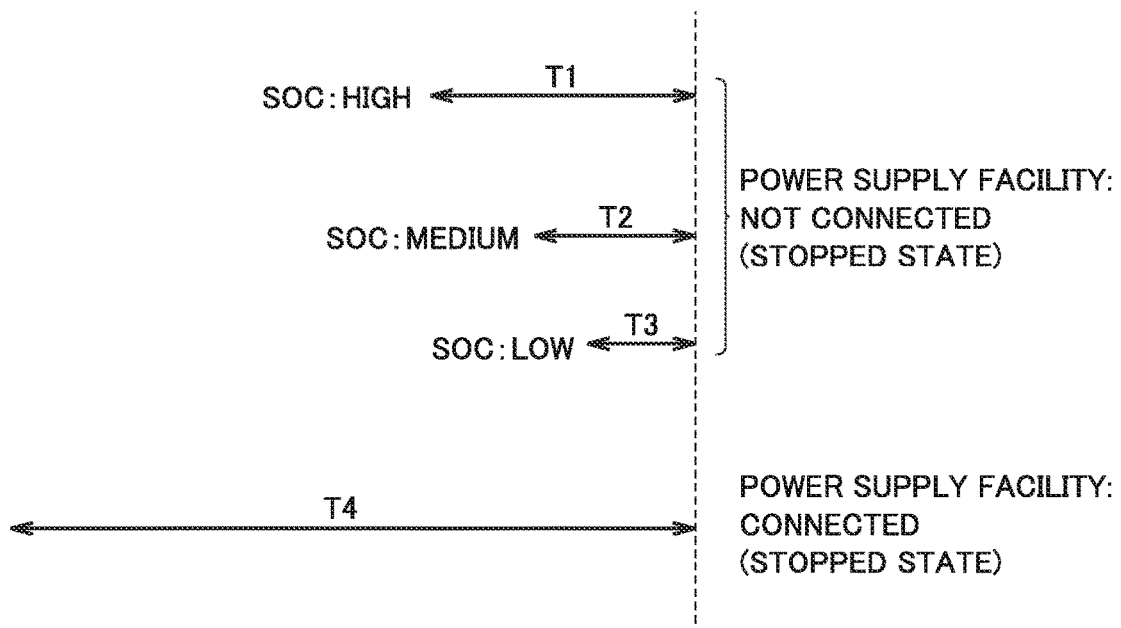
FIG. 5 shows an exemplary receivable time period set by the vehicle.

FIG. 5 shows an exemplary receivable time period set by vehicle 100. As shown in FIG. 5, vehicle 100 sets a receivable time period T4 for a case where vehicle 100 is in a stopped state with vehicle 100 being connected to power supply facility 500, to be longer than any of receivable time periods T1 to T3 each for a case where vehicle 100 is in the stopped state with vehicle 100 being not connected to power supply facility 500. It should be noted that the value of receivable time period T4 may be a predetermined fixed value or may be a variable value that is adjusted in accordance with a retention temperature for the cooled delivery matter or the like.

On the other hand, when vehicle 100 is in the stopped state with vehicle 100 being not connected to power supply facility 500 and the SOC of power storage device 110 is "high", the receivable time period is set at "T1", when vehicle 100 is in the stopped state with vehicle 100 being not connected to power supply facility 500 and the SOC of power storage device 110 is "medium", the receivable time period is set at "T2", and when vehicle 100 is in the stopped state with vehicle 100 being not connected to power supply facility 500 and the SOC of power storage device 110 is "low", the receivable time period is set at "T3" (T1>T2>T3). The value of each of receivable time periods T1 to T3 is set to correspond to a time period during which the temperature in refrigerator 190 can be maintained at the retention temperature for the cooled delivery matter by operating refrigerator 190 to such an extent that the SOC of power storage device 110 is not run out.

Vehicle 100 transmits, to delivery server 300, the receivable time period thus set.

Turning back to FIG. 4, when user terminal 200 receives the inquiry from delivery server 300, user terminal 200 presents a message on the display screen of user terminal 200 to request the user of vehicle 100 to input an expected reception time, and transmits, to delivery server 300, the expected reception time input by the user in response to this presentation (step S30).

It should be noted that the expected reception time is a time at which the user of vehicle 100 is expected to receive, at vehicle 100, the cooled delivery matter delivered to vehicle 100. As described above, in the delivery planning process according to the present embodiment, it is assumed that the cooled delivery matter is delivered to vehicle 100 within a relatively short period of time (for example, about some hours) from the transmission of the inquiry from delivery server 300 to vehicle 100. Hence, it is assumed that the expected reception time is set at a time within a relatively short period of time (for example, about some hours) from the reception of the inquiry from delivery server 300.

Based on the receivable time period received from vehicle 100 and the expected reception time received from user terminal 200, delivery server 300 determines the expected delivery time (step S12).

Figure 6:
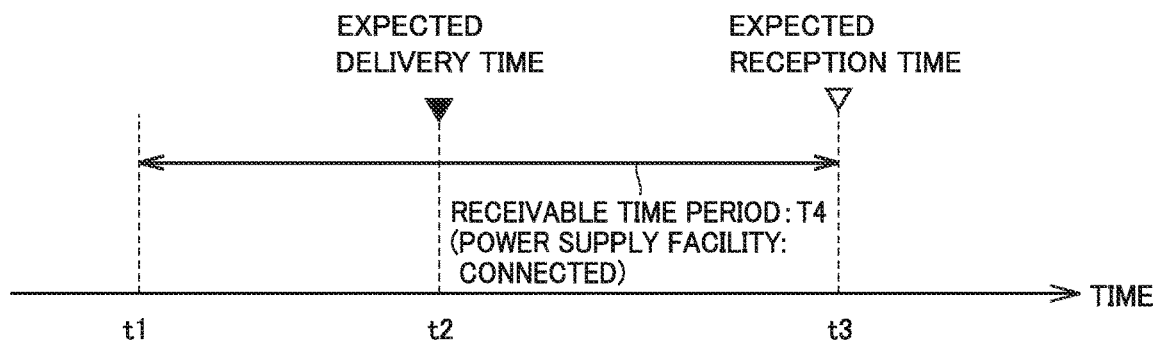
FIG. 6 shows an exemplary expected delivery time determined by the server.

FIG. 6 shows an exemplary expected delivery time determined by delivery server 300. It should be noted that FIG. 6 shows an example in which a "time t3" is set as the expected reception time and "time period T4" (see FIG. 5) for the case where power supply facility 500 is connected to vehicle 100 is set as the receivable time period.

In this case, delivery server 300 calculates a "time t1", which is time preceding expected reception time t3 by receivable time period T4. Then, as the expected delivery time, delivery server 300 sets a "time t2" included in a period from "time t1" to "expected reception time t3".

Here, "receivable time period T4" for the case where power supply facility 500 is connected to vehicle 100 is set to be longer than any of receivable time periods T1 to T3 each for the case where power supply facility 500 is not connected to vehicle 100 (see FIG. 5). Accordingly, the degree of freedom for delivery server 300 in determining expected delivery time t2 can be increased.

Further, the time period from expected delivery time t2 to expected reception time t3 is set to be shorter tha receivable time period T4. Accordingly, during the period of time from the delivery of the cooled delivery matter to vehicle 100 to the reception of the cooled delivery matter by the user, the cooled delivery matter can be retained and cooled within refrigerator 190 by operating refrigerator 190. Accordingly, the quality of the cooled delivery matter can be suppressed from being deteriorated by the time the user receives the delivery matter.

It should be noted that although not shown in FIG. 6, when power supply facility 500 is not connected to vehicle 100, the receivable time period is set to be shorter than receivable time period T4. However, also in this case, the receivable time period is set to be longer as the SOC of power storage device 110 is higher (as the amount of power stored in power storage device 110 is larger) (see receivable time periods T1 to T3 in FIG. 5). Accordingly, while suppressing the SOC of power storage device 110 from being run out due to the operation of refrigerator 190, the receivable time period can be set to be as long as possible.

Turning back to FIG. 4, delivery server 300 transmits, to vehicle 100 and user terminal 200, the delivery information including the information of the expected delivery time determined in step S12, the retention temperature for the cooled delivery matter, and the expected reception time (step S14).

When user terminal 200 receives the delivery information (the information of the expected delivery time, retention temperature, and expected reception time) from delivery server 300, user terminal 200 presents the received delivery information on the display screen of user terminal 200 (step S32). Accordingly, the user can check the expected delivery time of the cooled delivery matter and the retention temperature for the cooled delivery matter, and can check again the expected reception time having been notified to delivery server 300 by the user.

When vehicle 100 receives the delivery information (the information of the expected delivery time and retention temperature) from delivery server 300, vehicle 100 performs "timer cooling" in which refrigerator 190 is preliminarily operated before the expected delivery time is reached, so as to control the temperature in refrigerator 190 at the expected delivery time to be the retention temperature for the cooled delivery matter (step S22).

Figure 7:
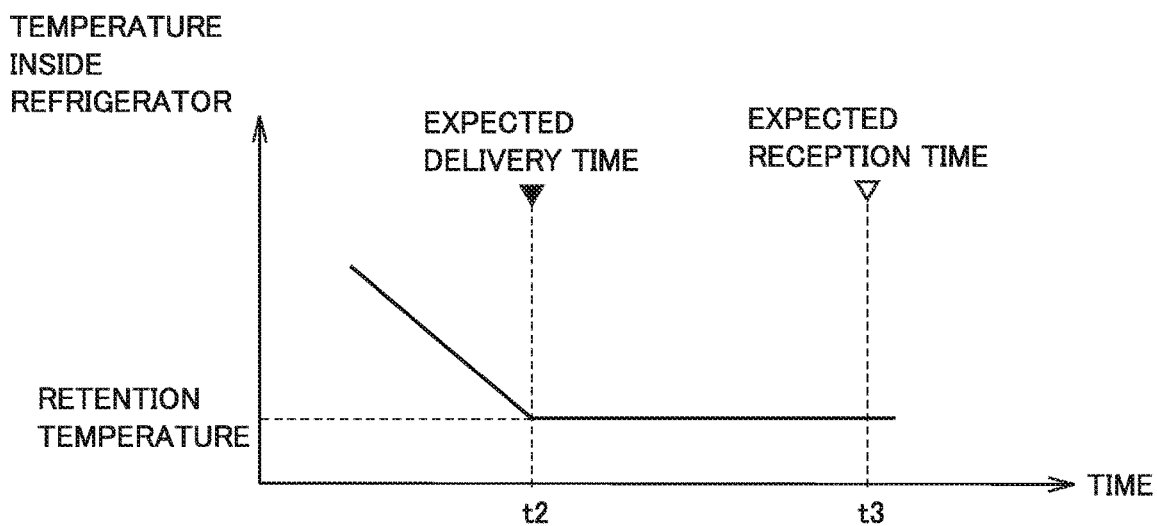
FIG. 7 illustrates an exemplary temperature change in a refrigerator due to timer cooling.

FIG. 7 illustrates an exemplary temperature change in refrigerator 190 due to the timer cooling. It should be noted that FIG. 7 shows an example in which the expected delivery time is "time t2" and the expected reception time is "time t3".

In this case, by preliminarily operating refrigerator 190 before expected delivery time t2 is reached, vehicle 100 decreases the temperature in refrigerator 190 such that the temperature in refrigerator 190 at expected delivery time t2 becomes the retention temperature for the cooled delivery matter. Therefore, as compared with a case where refrigerator 190 is operated after the cooled delivery matter is delivered to vehicle 100, the cooled delivery matter can be retained at the optimal temperature from the moment of the delivery of the cooled delivery matter, whereby the quality deterioration of the delivery matter can be suppressed appropriately.

Further, vehicle 100 operates refrigerator 190 during the period from expected delivery time t2 to expected reception time t3, so as to maintain the temperature in refrigerator 190 to be the retention temperature for the cooled delivery matter. Accordingly, the cooled delivery matter can be retained and cooled at an appropriate temperature within refrigerator 190 during the period from expected delivery time t2 at which the cooled delivery matter is delivered to vehicle 100 to expected reception time t3 at which the user receives the cooled delivery matter. Accordingly, the quality of the delivery matter can be suppressed from being deteriorated by the time the user receives the delivery matter.

As described above, in delivery system 10 according to the present embodiment, when power supply facility 500 is connected to vehicle 100 (when vehicle 100 is in the state that vehicle 100 can receive power from power supply facility 500), the receivable time period in vehicle 100 is set to be long in view of such a fact that refrigerator 190 can be operated using power supplied from power supply facility 500 in addition to power of power storage device 110. Accordingly, the degree of freedom for delivery server 300 in determining the expected delivery time in the delivery planning process can be increased. This facilitates determining a time at which the cooled delivery matter is delivered to refrigerator 190 of vehicle 100.

Further, in the delivery planning process, delivery server 300 according to the present embodiment receives the receivable time period from vehicle 100, receives the expected reception time for the user from user terminal 200, and sets, as the expected delivery time, a time included in the period from the time preceding the expected reception time by the receivable time period to the expected reception time. Accordingly, the time period from the expected delivery time to the expected reception time for the user is set to be shorter than the receivable time period in the vehicle. Therefore, the cooled delivery matter can be retained and cooled within refrigerator 190 during the period from the delivery of the cooled delivery matter to the vehicle to the reception of the cooled delivery matter by the user. As a result, the quality of the cooled delivery matter can be suppressed from being deteriorated by the time the user receives the cooled delivery matter.

<Modification 1>

In the above-described embodiment, it has been illustratively described that the user of vehicle 100 inputs the expected reception time using user terminal 200 in response to user terminal 200 receiving the inquiry from delivery server 300. However, the means and timing for inputting the expected reception time by the user of vehicle 100 are not limited thereto.

For example, if the user of vehicle 100 wishes to deliver, as a cooled delivery matter, a merchandise item purchased by the user to vehicle 100 at his/her home, the user may input an expected reception time using user terminal 200 or a terminal of the seller of the merchandise item when purchasing the merchandise item. When the user inputs the expected reception time using the terminal of the seller, the expected reception time may be transmitted from the terminal of the seller to delivery server 300.

<Modification 2>

In the above-described embodiment, it has been illustratively described that power is supplied from power supply facility 500 to vehicle 100 in a wired manner (charging cable 510); however, power may be supplied from power supply facility 500 to vehicle 100 in a wireless manner (contactless manner). In this case, when vehicle 100 is in a state that vehicle 100 can contactlessly receive power from power supply facility 500, the receivable time period in vehicle 100 may be set to be long.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A delivery system comprising:
a vehicle including
a power storage device configured to be charged using power supplied from a power supply facility external to the vehicle, and
a refrigerator configured to be operated using power of the power storage device;
a server configured to communicate with the vehicle, the server being configured to perform a delivery planning process for determining an expected delivery time at which a delivery matter required to be cooled during retention is delivered to the refrigerator of the vehicle,
in the delivery planning process, the server being configured to transmit, to the vehicle, an inquiry as to reception of the delivery matter,
when the vehicle receives the inquiry from the server, the vehicle being configured to set a receivable time period and transmit the receivable time period to the server, the receivable time period being a time period during which the delivery matter is able to be cooled within the refrigerator,
when the vehicle sets the receivable time period, if the vehicle is in a state that the vehicle is able to receive power from the power supply facility, the vehicle being configured to set the receivable time period to be longer than the receivable time period set if the vehicle is not in the state that the vehicle is able to receive power from the power supply facility.

2. The delivery system according to claim 1, wherein in the delivery planning process, the server is configured to
receive the receivable time period from the vehicle,
receive, from an external terminal, an expected reception time of the delivery matter for a user of the vehicle, and
set, as the expected delivery time, a time included in a period from (i) a time preceding the expected reception time by the receivable time period to (ii) the expected reception time.

3. The delivery system according to claim 2, wherein in the delivery planning process, the server is configured to transmit, to the vehicle, delivery information including the expected delivery time and a retention temperature for the delivery matter, and when the vehicle receives the delivery information from the server, the vehicle is configured to preliminarily operate the refrigerator before the expected delivery time is reached, so as to control a temperature in the refrigerator at the expected delivery time to be the retention temperature.

4. The delivery system according to claim 1, wherein when the vehicle sets the receivable time period, if the vehicle is not in the state that the vehicle is able to receive power from the power supply facility, the vehicle is configured to set the receivable time period to be longer as an amount of power stored in the power storage device is larger.

5. A vehicle comprising:
- a power storage device configured to be charged using power supplied from a power supply facility external to the vehicle;
- a refrigerator configured to be operated using power of the power storage device; and
- a controller configured to set a receivable time period, the receivable time period being a time period during which a delivery matter required to be cooled during retention is delivered to the vehicle and is able to be retained in the refrigerator,
- when the controller sets the receivable time period, if the vehicle is in a state that the vehicle is able to receive power from the power supply facility, the controller being configured to set the receivable time period to be longer than the receivable time period set if the vehicle is not in the state that the vehicle is able to receive power from the power supply facility.

* * * * *